United States Patent [19]

Leeson et al.

[11] 4,007,147
[45] Feb. 8, 1977

[54] WATER BASED HARDBOARD COATING COMPOSITIONS OF AN ACRYLIC ESTER INTERPOLYMER LATEX, A VINYL CHLORIDE POLYMER LATEX, A WATER REDUCIBLE THERMOSET RESIN, AND PIGMENT(S)

[75] Inventors: Edward J. Leeson, Avon Lake; Robert U. Ludwig, Lorain, both of Ohio

[73] Assignee: The B. F. Goodrich Company, Akron, Ohio

[22] Filed: Apr. 30, 1975

[21] Appl. No.: 572,960

[52] U.S. Cl. .................. 260/29.4 UA; 260/23 XA; 428/460; 428/463; 428/541

[51] Int. Cl.² ........................................ C08G 51/24

[58] Field of Search ...... 260/29.4 UA, 851, 23 EM, 260/23 XA

[56] References Cited

UNITED STATES PATENTS 2,600,681  6/1952  Park et al. ................ 260/29.4 UA
3,231,533  1/1966  Garrett et al. ................ 260/80.73

FOREIGN PATENTS OR APPLICATIONS 611,904  11/1948  United Kingdom .......... 260/23 EM

OTHER PUBLICATIONS

B. F. Goodrich Service Bulletin, LSB–31, 1970.
B. F. Goodrich Service Bulletin, No. 913–27–98–1, 1971.

Primary Examiner—Theodore E. Pertilla
Attorney, Agent, or Firm—Alan A. Csontos

[57] ABSTRACT

A water-based coating composition comprising (1) a low soap level acrylic ester interpolymer latex, (2) a fatty acid soap emulsified vinyl chloride polymer latex having substantially uniform particle size, (3) a water reducible thermoset resin, and (4) pigment(s) in an about 5% to about 60% pigment volume concentration, is an improved coating composition for hardboard.

10 Claims, No Drawings

WATER BASED HARDBOARD COATING COMPOSITIONS OF AN ACRYLIC ESTER INTERPOLYMER LATEX, A VINYL CHLORIDE POLYMER LATEX, A WATER REDUCIBLE THERMOSET RESIN, AND PIGMENT(S)

BACKGROUND OF THE INVENTION

The building trade and related industries consume many square feet annually of forest product materials which require protective or decorative coatings. One of the most used forest product materials is hardboard which is made from ground or chipped wood fibers mixed with a suitable cohesive and pressed. The hardboard surface is coated to improve stain resistance, water and solvent resistance, hardness, and to impart aesthetic value, and for exterior applications, such as siding, to impart weather resistance. Typically, the coating systems have been solvent-based resin compositions. The use of such compositions requires extra safety and health precautions to reduce solvent escape into the air. A water-based coating composition would be less toxic and less polluting.

The use of thermoset resins with an acrylic ester or a polyvinyl chloride latex is generally known (see U.S. Pat. Nos. 2,450,902; 2,600,681; and 2,906,724). The mixture of a typical acrylic ester latex with a polyvinyl chloride latex does not yield a coating composition suitable for application using standard industrial finishing methods due to poor resistance of the deposited film to water and solvents. It was unexpectedly found that a combination of specific ingredients produces a superior water-based coating composition.

SUMMARY OF THE INVENTION

Improved water-based coating compositions for hardboard are presented which comprise (1) a low soap level acrylic ester interpolymer latex, (2) a fatty acid soap emulsified vinyl chloride polymer latex having substantially uniform particle size, (3) a water reducible thermoset resin, and (4) pigment(s) in level from about 5% to about 60% volume concentration. The compositions have improved flow and film properties, particularly in coatability, and improved resistance to water, stains, and solvents.

DETAILED DESCRIPTION OF THE INVENTION

The water-based coating compositions of the invention contain stable admixtures of both an acrylic ester latex and a polyvinyl chloride latex with a water reducible thermoset resin. A pigment(s) is used to provide opaque weather resistant coatings. An acid catalyst can be employed to effectuate and accelerate cure of the composition. The acrylic ester latex is used at a level of from about 50 parts to about 90 parts by weight on a dry weight basis per 100 parts by weight total (dry weight) of latex polymer. Correspondingly, the vinyl chloride polymer latex is used at a level of from about 10 parts to about 50 parts by weight on a dry weight basis per 100 parts by weight total of latex polymer. More preferredly, the acrylic ester polymer latex is used in from about 75 parts to about 85 parts by weight, and the vinyl chloride polymer latex is used in from about 15 parts to about 25 parts by weight. The water reducible thermoset resin is used at from about 5 parts to about 35 parts by weight per 100 parts by weight (dry weight) of the total weight of the latex polymer. More preferredly, the resin is used at about 25 parts by weight per 100 parts of latex polymer. The pigment(s) is used in a pigment volume concentration of from about 5% to about 60% volume concentration. Pigment volume concentration is the percent volume of pigment in the composition per volume of polymer latex. The volume of pigment is readily calculated from the parts by weight of pigment used and its specific gravity. A more preferred pigment volume concentration range is from about 20% to about 50% by volume. The acid catalyst, when used, is employed in from about 0.5 part to about 10 parts by weight per 100 parts by weight total (dry weight) of the latex polymer.

The reactive acrylic ester polymer is the major ingredient in the composition. The acrylic ester polymer is an interpolymer of from about 9% to about 99% by weight of an acrylic ester monomer(s), up to about 90% by weight of a comonomer(s), and from about 1% to about 10% by weight of a reactive cure-site monomer(s). More preferredly, the polymer is an interpolymer of interpolymerized units of from about 9% to about 80% by weight of an acrylic ester, from about 10% to about 90% by weight of a comonomer, and from about 1% to about 10% by weight total of a reactive cure-site monomer(s). The polymer can be prepared using low soap emulsion polymerization processes known to those skilled in the art, such as the process described in U.S. Pat. No. 3,231,533. A particularly good process is a low soap emulsion polymerization process such as that disclosed in U.S. Pat. No. 3,457,209 which is hereby incorporated by reference. Soap levels of from about 0.01% to about 3% by weight based upon the total weight of monomers are employed. A polymer latex made following the low soap process has a typical particle size of from about 1000 Å to about 3000 Å.

The acrylic ester polymer is comprised of about 9% to about 99% by weight of interpolymerized units of at least one acrylic ester monomer of the formula

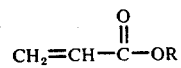

wherein R is an alkyl group containing from 1 to about 18 carbon atoms, an alkoxyalkyl or alkylthioalkyl group containing from 2 to about 8 carbon atoms in the group, or a cyanoalkyl group containing 2 to about 8 carbon atoms in the group. The carbon structure in the alkyl groups can be linear or branched, i.e. can contain primary, secondary, or tertiary carbon configurations. Examples of such monomers are methyl acrylate, ethyl acrylate, n-butyl acrylate, isobutyl acrylate, hexyl acrylate, octyl acrylate, 2-ethylhexyl acrylate, decyl acrylate, dodecyl acrylate, octadecyl acrylate, and the like; methoxyethyl acrylate, ethoxyethyl acrylate, and the like; and methylthioethyl acrylate, and the like; and α, β, and γ-cyanopropyl acrylate, and the like. Excellent results have been obtained using an acrylic ester monomer(s) wherein the R group is an alkyl group containing 1 to about 10 carbon atoms in the group.

Copolymerized with the acrylic ester monomer(s) can be one or more vinylidene comonomers containing a terminal ($CH_2\!\!=\!\!C<$) group. The comonomers are present as interpolymerized units in amounts of up to 90% by weight, and, more preferredly, from about 10% to about 90% by weight. Examples of such comonomers are the meth- and ethacrylic esters such as methyl methacrylate, ethyl methacrylate, n-butyl methacrylate, methyl ethacrylate, and the like; vinyl halides such as vinyl chloride, vinyl and allyl esters such as vinyl acetate, vinyl butyrate, vinyl chloroacetate, and the like; and allyl acetate, methallyl propionate, and the like; vinyl aromatics such as styrene, vinyl toluene, chloromethyl styrene, vinyl naphthalene, and the like; vinyl nitriles such as acrylonitrile, methacrylonitrile, and the like. Preferredly, the weight and type of comonomer is used to produce an acrylic ester polymer having a glass transition temperature (Tg value) of 20° C. or more. Amounts of a given monomer necessary to obtain a Tg value are readily calculated using known formulas - see Nielsen, Mechanical Properties of Polymers, Reinhold Publishing Co., N.Y., N.Y., (1962), page 27. Excellent results have been obtained when vinyl chloride, methyl methacrylate, acrylonitrile, and/or styrene was used as the comonomer.

The reactive cure-site monomer is a carboxyl-containing vinylidene monomer or a hydroxyl-containing vinylidene monomer used alone or in combination with an acrylamide or carboxyl monomer. The hydroxyl-containing vinylidene monomer includes hydroxy-terminal acrylate monomers such as β-hydroxyethyl acrylate and methacrylate, α-hydroxypropyl acrylate, 4-hydroxybutyl acrylate, and the like; N-alkylol vinylidene amides, and hydroxymethyl derivatives of diacetone acrylamide of the formula

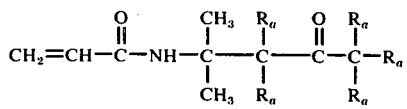

wherein $R_a$ is hydrogen or $-CH_2OH$ and the number of hydroxymethyl groups is at least one. Preferred are the N-alkylol amides of alpha, beta-olefinically unsaturated monocarboxylic acids containing 4 to 10 carbon atoms. Examples of such are N-methylol acrylamide, N-methylol methacrylamide, N-methylol maleamide, N-propanol acrylamide, N-methylol-p-vinyl benzamide, and the like. Most preferred because of their availability and cost are the N-alkylol amides of alpha, beta-monoolefinically unsaturated monocarboxylic acids such as N-methylol acrylamide, N-methylol methacrylamide, and the like.

The carboxyl-containing vinylidene monomer is an α,β-olefinically unsaturated carboxylic acid such as acrylic and methacrylic acid, itaconic acid, citraconic acid, maleic acid, allyl acetic acid, and the like. More preferredly, the carboxyl monomer is vinylidene monocarboxylic acid containing 3 to about 6 carbon atoms such as acrylic and methacrylic acid. The hydroxyl-containing vinylidene monomers are preferredly used in combination with an acrylamide monomer or a carboxyl monomer. The acrylamide monomer is acrylamide or methacrylamide.

The second major ingredient in the coating composition is a vinyl chloride polymer latex having a substantially uniform particle size. The particle size per se ranges from about 2000 A to about 5000 A. The vinyl chloride polymers are prepared via emulsion polymerization using a fatty acid salt as the emulsifier. A typical polymerization recipe would include 100 parts by weight of monomer, 2.5 parts by weight of ammonium laurate, 0.3 part by weight of potassium persulfate, and 125 parts by weight of water. Polymerization temperature would be about 50° C.

The vinyl chloride polymer is an interpolymer of from about 50% to 100% by weight (i.e., homopolymer) of vinyl chloride, up to 45% by weight of vinylidene chloride, and up to 5% by weight of another copolymerizable vinylidene monomer such as alkyl acrylates, vinyl acetate, α-monoolefins, and the like. More preferred, the vinyl chloride polymer is a polyvinyl chloride homopolymer.

Another major ingredient in the latex coating composition is a water-reducible urea-formaldehyde or melamine-formaldehyde thermoset resin. Examples of melamine-formaldehyde resin are the Cymel resins (sold by American Cyanamid Co.) such as the hexamethoxymethyl melamine resins, the Uformite resins (sold by Rohm and Haas), and the Resimene resins (sold by Monosanto Co. and disclosed in Product Information Bulletin No. 1094A). Examples of urea-formaldehyde resins are the Beetle resins (sold by American Cyanamid Co.) and the Rhonite resins (sold by Rohm and Haas Co.). Excellent results have been obtained using a Cymel resin.

The pigments employed are standard pigments known to the art. These pigments include clays (aluminum silicate) such as kaolin clay, calcium and magnesium carbonate, mica, talc (magnesium silicate), diatomaceous earth, titanium dioxide, both anatase and rutile forms, and the like.

The acid catalyst, which is an optional ingredient, can be an organic, inorganic or Lewis acid. The function of the acid is to accelerate the cure of the composition. Examples of the acids are phosphoric acid, boric acid, citric acid, oxalic acid, p-toluene sulfonic acid, zinc nitrate, and the like. Often the acids are used in the form of alkali metal or ammonium or amine salts of the acid. Preferredly, the acid is an organic acid such as oxalic acid or p-toluene sulfonic acid.

The water-based coating compositions produce excellent protective coatings on hardboard. Many other compounding ingredients well known to those skilled in the art, such as thickeners, coalescing acids, fillers and reinforcing agents, plasticizers and extenders, antioxidants and stabilizers, fungicides, and the like, can be employed.

The ingredients of the coating composition (plus other desired compounding ingredients) are readily admixed using mixing kettles. Bases can be used to raise the pH of the latex to above 7, and, preferredly, to about 8 to 10. The bases used can be any basic compound known to the art, but, preferredly, are ammonia, ammonium hydroxide, or amines. Although any amine can be used, the type of amine employed affects the overall stability of the latex coating composition. Lower alkyl and alkanol amines were found to raise the pH of the latex and provide excellent stable compositions. By lower alkyl and alkanol amines is meant di- and trialkyl or alkanol amines wherein the alkyl or alkanol group contains 1 to 4 carbon atoms. Examples of such amines are dimethylethylamine, triethylamine, diethanolamine, triethanolamine, dimethylethanolamine, dimethylaminomethyl propanol, and mono-, di-, and triisopropanolamine.

The coating composition is stable and has excellent flow characteristics, particularly in its ability to be sprayed and curtain coated. The films put down on the hardboard are cured by heating the substrate surface temperature to above 160° F., more preferredly at about 250° F. to about 325° F. for about 1 minute (at 300° F.) to about 10 minutes or more at lower temperatures. Ambient air temperatures necessary to heat the surfaces can be as high as 600° F. The cured coating provides excellent protection against water, steam, and chemicals, and provides a smooth and aesthetic surface.

Although the water-based coating composition is directed to use as a coating composition for hardboard, it can be readily and effectually used to provide protective and decorative coatings for all types of wood and metal surfaces.

The following examples are set forth to further illustrate the invention. Ingredients are given in parts by weight unless otherwise specified.

EXAMPLES

Coating compositions were prepared by admixing the separate ingredients using a mixing kettle. The compositions were applied as thin coatings to hardboard, cured, and evaluated as to their ability to protect the coated surface against water. The test employed was water absorption in grams per 100 square inches of surface. The test consisting of placing a one-half inch deep column of water upon the cured coated surface. If the water penetrates the coating, it is absorbed by the hardboard. The test specimen is weighed before and after the water absorption test. The difference in weight indicates how much water penetrated the coating and was taken up by the hardboard. The test is usually run for 24 hours, but can be run for longer times. A water uptake of 20 grams or more per 100 inches$^2$ per 24 hours is achieved with conventional coating compositions. The coating systems of this invention will exhibit water absorptions of less than 20 grams and as low as 2 grams of water per 100 inches$^2$ per 24 hours. Additionally, the compositions of the invention do not blister during the cure, and show improved resistance to mud cracking. Furthermore, the cured coatings do not block (stick to each other upon stacking face-to-face) and are resistant to methylethyl ketone (MEK) in that they do not rub off in 100 double wipes and often survive 200 double wipes or more.

EXAMPLE I

An acrylic ester latex polymer (Polymer Latex A) consisting of interpolymerized units of about 44.5% by weight n-butyl acrylate, about 44.5% by weight styrene, about 5% acrylonitrile, about 5% acrylic acid, and about 1% by weight of N-methylol acrylamide and prepared using a soap level of about 0.3% by weight, was admixed with a vinyl chloride homopolymer resin latex prepared using ammonium laurate as the fatty acid soap. A melamine-formaldehyde thermoset resin marketed by Monsanto Co. as Resimene X735 and pigments, along with standard latex compounding ingredients were added to the mix. A recipe for preparing a uniform particle size fatty acid soap emulsified polyvinyl chloride latex is as follows (in parts by weight): 220 parts by weight of water is put into a clean reactor vessel equipped for heating and agitation. A solution of 0.4 parts by weight of sodium stearate and 0.1 part by weight of potassium persulfate in 15 parts by weight of water is added to the reactor vessel. The vessel is evacuated by putting it under a vacuum, purged with nitrogen, reevacuated, and 100 parts by weight of vinyl chloride added. The vessel is agitated and heated to about 50° C. for about 16 hours. Final conversion of monomer to polymer can be determined by measurement of total solids.

The coating composition recipe used, in dry parts by weight in grams unless otherwise indicated, is as follows. Parts by weight expressed on a basis of 100 parts total of latex is given in parenthesis.

| | |
|---|---|
| Acrylic ester polymer latex A | 70 (88) |
| Vinyl Chloride Latex | 10 (12) |
| Thermoset Resin | 20 (25) |
| Titanium Dioxide$^d$ | 100 |
| Clay$^{a,d}$ | 100 |
| Water (milliliters) | 86 |
| Dispersing Agent$^b$ | 0.5 |
| p-Toluenesulfonic Acid and Ammonium Hydroxide$^c$ (milliliters) | 4 |

$^a$marketed under trade name Hydrasperse
$^b$marketed under trade name Nopcosant L, used in 25% by weight in water
$^c$mixed as solution in isopropanol, 20% by weight active
$^d$40% pigment volume concentration The composition was coated onto hardboard test samples using a spray gun at a coating thickness of about 1.5 to 2 mils, and heated in a high velocity air-circulating oven at 450° F. for 55 seconds to effect cure. The water absorptivity values for the coating ranged from 2 to 5 grams per 100 square inches in 24 hours.

EXAMPLE II

Following the general procedure given in Example I, other coating compositions were prepared and evaluated. The coatings were put on Abitibi and Masonite hardboards using a spray gun. The coatings were cured for 1.5 minutes at 450° F. The acrylic ester polymer latex used (Polymer Latex B) consisted of interpolymerized units of about 52% by weight ethyl acrylate, 15% by weight n-butyl acrylate, 28% by weight acrylonitrile, 3% by weight acrylamide, and 2% by weight of N-methylol acrylamide. The vinyl chloride polymer latex was a polyvinyl chloride homopolymer latex. The thermoset resin was a melamine-formaldehyde resin marketed by the American Cyanamid Co. as Cymel 303. The recipe used, in dry parts by weight unless otherwise indicated, is as follows (expressed on a basis of 100 parts in parenthesis):

| | |
|---|---|
| Acrylic ester polymer latex B | 64 (80) |
| Vinyl chloride polymer latex | 16 (20) |
| Thermoset resin | 20 (25) |
| Titanium dioxide$^a$ | 50 |
| Talc$^a$ | 50 |
| CaCO$_3$$^a$ | 50 |
| 2-(4-thiazolyl)benzimidazole | 1 |
| Water, milliliters | 65 |
| Dioxitol$^b$ | 20 |
| Nopcosant L$^c$ | 0.4 |
| p-toluenesulfonic acid and dimethylethylamine$^d$ (milliliters) | 10 |

$^a$35% pigment volume concentration
$^b$diethylene glycol monoethyl ether
$^c$dispersing agent, 25% active
$^d$mixed as solution in isopropanol, 20% by weight active The cured coatings were on the hardboard test samples in a weight equal to 11 grams to 19 grams per square foot of hardboard surface. The measured water absorptivity of the test samples ranged from 9.6 to 14.3 grams per 100 inch$^2$ in 24 hours.

EXAMPLE III

The acrylic ester polymer latexes of Examples I and II were admixed with a vinyl chloride homopolymer latex, a melamine-formaldehyde thermoset resin, and pigments at a pigment volume concentration of 40% along with standard compounding ingredients. The recipes used are as follows:

|  | 1 | 2 | 3 |
|---|---|---|---|
| Acrylic ester polymer latex A | — | 64 (80) | 16 (20) |
| Acrylic ester polymer latex B | 64 (80) | — | — |
| Vinyl chloride polymer latex | 16 (20) | 16 (20) | 64 (80) |
| Thermoset resin | 20 (25) | 20 (25) | 20 (25) |
| Titanium dioxide | 50 | 50 | 50 |
| Talc | 75 | 75 | 75 |
| CaCO$_3$ | 75 | 75 | 75 |
| 2-(4-thiazolyl)benzimidazole | 0.5 | 0.5 | 0.5 |
| Water, milliliters | 86 | 86 | 86 |
| Nopcosant L | 0.5 | 0.5 | 0.5 |
| Pluronic L-62$^a$ | 1 | 1 | 1 |
| p-toluenesulfonic acid and ammonia$^b$, milliliters | 20 | 20 | 20 |

$^a$polyether non-ionic emulsifier
$^b$10% active in water

Sample compositions 1 and 2 are within the scope of the invention. Sample 3 has a ratio of vinyl chloride polymer to acrylic ester polymer outside of the described weight ratio. The compositions were coated onto hardboard and cured at a surface temperature of about 280° F. The boards had a coating weight of 10 to 12 grams per square foot of board surface. Water absorptivity and resistance to MEK wipes was tested.

|  | 1 | 2 | 3 |
|---|---|---|---|
| Water absorption (grams/100 in.$^2$ in 90 hours) | 8.8 | 6.9 | 30.1 |
| Failure in 100 MEK wipes | no | no | no |

Although all three samples showed good resistance to methylethyl ketone solvent, samples 1 and 2, compositions within the scope of the invention also showed excellent water resistance.

EXAMPLE IV

The following coating compositions were prepared and evaluated as coatings for hardboard. The recipes are similar to those of samples 1 and 2 of Example III except for the use of propylene glycol.

|  | 1 | 2 | 3 |
|---|---|---|---|
| Acrylic ester polymer latex A | 64 (80) | — | — |
| Acrylic ester polymer latex B | — | 72 (90) | 64 (80) |
| Vinyl chloride homopolymer latex | 16 (20) | 8 (10) | 16 (20) |
| Melamine-formaldehyde resin | 20 (25) | 20 (25) | 20 (25) |
| Titanium dioxide$^a$ | 50 | 50 | 50 |
| Talc$^a$ | 75 | 75 | 75 |
| CaCO$_3$$^a$ | 75 | 75 | 75 |
| Propylene glycol | 20 | 28 | 26 |
| 2-(4-thiazolyl)benzimidazole | 0.5 | 0.5 | 0.5 |
| Water, milliliters | 86 | 86 | 86 |
| Nopcosant L | 0.5 | 0.5 | 0.5 |
| Pluronic L-62 | 1 | 1 | 1 |
| p-toluene sulfonic acid and ammonium hydroxide, 10% active in water (milliliters) | 20 | 20 | 20 |
| Coating cured at about 280° F. Coating weight (grams/square foot surface) | 12 | 9 | 12 |
| Water absorption (grams/100 sq. in. in 24 hours) | 6.5$^b$ | 15.4 | 12.2$^b$ |

$^a$40% pigment volume concentration
$^b$average of two tests

We claim:
1. A water-based coating composition comprising (1) from about 50 parts to about 90 parts by weight on a dry basis of an acrylic ester interpolymer latex wherein the latex is prepared in the presence of from about 0.01 percent to about 3 percent by weight of soap emulsifier, the weight based upon the total weight of monomer, by the interpolymerization of (a) from about 9 percent to about 99 percent by weight of at least one acrylic ester monomer of the formula

$$CH_2=CH-\overset{\overset{\displaystyle O}{\|}}{C}O-R'$$

wherein R' is selected from the group consisting of an alkyl radical containing 1 to about 18 carbon atoms and alkoxyalkyl, alkylthioalkyl, and cyanoalkyl radicals containing 2 to about 8 carbon atoms in the group, (b) up to 90 percent by weight of a vinylidene comonomer containing a terminal $CH_2=C<$ group, and (c) from about 1 percent to about 10 percent by weight of a reactive cure-site monomer selected from the group consisting of carboxyl-containing vinylidene monomers, hydroxyl-containing vinylidene monomers, and hydroxyl-containing vinylidene monomers in combination with a carboxyl-containing vinylidene monomer or an acrylamide monomer, (2) from about 10 parts to about 50 parts by weight on a dry basis of a vinyl chloride polymer latex having substantially uniform particle size, wherein the latex is prepared by interpolymerization of the monomer(s) in the presence of a fatty acid soap emulsifier, (3) from about 5 parts to about 35 parts by weight per 100 parts by weight of latex polymer of a water reducible thermoset resin selected from the group consisting of melamine-formaldehyde resins and urea-formaldehyde resins, and (4) from about a 5 percent to about a 60 percent pigment volume concentration per total volume of latex.

2. A composition of claim 1 where (2) is a polyvinyl chloride homopolymer latex having a substantially uniform particle size ranging from about 2000 A to about 5000 A.

3. A composition of claim 2 where an acid catalyst is employed.

4. A composition of claim 3 wherein the acrylic ester polymer latex is used in from about 75 parts to about 85 parts by weight, the vinyl chloride polymer latex is used in from about 15 parts to about 25 parts by weight, the water reducible thermoset resin is used at about 25 parts by weight, and the pigment volume concentration ranges from about 20 percent to about 50 percent by volume.

5. A composition of claim 4 wherein the acrylic ester polymer is comprised of interpolymerized units of (a) from about 9 percent to about 80 percent by weight of one or more acrylic ester monomers wherein R is an alkyl radical containing 1 to about 10 carbon atoms, (b) from about 10 percent to about 90% by weight of a comonomer selected from the group consisting of styrene, acrylonitrile, and mixtures thereof, and (c) from about 1 percent to about 10 percent by weight of a cure-site monomer wherein the hydroxyl-containing vinylidene monomer is an N-alkylol amide of an $\alpha,\beta$-olefinically unsaturated monocarboxylic acid containing 4 to 10 carbon atoms, the carboxyl-containing vinylidene monomer is a vinylidene monocarboxylic acid containing 3 to about 6 carbon atoms, and the acrylamide monomer is acrylamide or methacrylamide.

6. A composition of claim 5 wherein the acrylic ester polymer latex is used at about 80 parts by weight, the vinyl chloride polymer latex is used at about 20 parts by weight, and the pigment volume concentration is about 40 percent.

7. A composition of claim 6 wherein the acrylic ester polymer is comprised of interpolymerized units of n-butyl acrylate, styrene, acrylonitrile, acrylic acid, and N-methylol acrylamide.

8. A composition of claim 5 where (4) is selected from the group consisting of titanium dioxide, talc, clay, calcium carbonate, and mixtures thereof.

9. A composition of claim 1 wherein the acrylic ester interpolymer is comprised of interpolymerized units of n-butyl acrylate, ethyl acrylate, acrylonitrile, acrylamide, and N-methylol acrylamide.

10. A composition of claim 1 where (1) is an acrylic ester interpolymer latex having a particle size in the range of from about 1000 A to about 3000 A.

* * * * *